United States Patent [19]
Packa et al.

[11] Patent Number: 5,717,609
[45] Date of Patent: Feb. 10, 1998

[54] SYSTEM AND METHOD FOR ENERGY MEASUREMENT AND VERIFICATION WITH CONSTANT BASELINE REFERENCE

[75] Inventors: Daniel E. Packa, Lorton, Va.; Jeffrey A. Mason, Baltimore; James E. Hondroulis, Glen Arm, both of Md.; Keith R. Johnson, Calumet, Mich.; Thomas L. Hurley, Mt. Airy, Md.

[73] Assignee: EMV Technologies, Inc.

[21] Appl. No.: 701,487

[22] Filed: Aug. 22, 1996

[51] Int. Cl.⁶ .................................................. G06F 17/50
[52] U.S. Cl. .................................... 364/557; 364/506
[58] Field of Search .............. 364/557, 551.01, 364/505, 506; 73/112; 165/11.1, DIG. 2; 236/94; 274/29, 39, 43, 41, 30, 44

[56] References Cited

U.S. PATENT DOCUMENTS

| | | | |
|---|---|---|---|
| 4,364,676 | 12/1982 | Oja et al. | 364/557 |
| 4,485,449 | 11/1984 | Knauss | 364/510 |
| 4,568,198 | 2/1986 | Szabo et al. | 364/557 |
| 4,766,553 | 8/1988 | Kaya et al. | 364/506 |
| 5,513,519 | 5/1996 | Cauger et al. | 73/112 |

OTHER PUBLICATIONS

Measurement and Verification Guideline for Federal Energy Projects, DOE/GO–10096–248, Feb. 1996.
North American Energy Measurement and Verification Protocol, DOE, Mar. 1996.
"Energy Mart" Brochure for Teleg R–2104 RTD, Oct. 1996.

*Primary Examiner*—James P. Trammell
*Attorney, Agent, or Firm*—Michael D. Bednarek; Kilpatrick Stockton LLP

[57] ABSTRACT

Disclosed is an energy measurement and verification system and method which provides real time documentation of both baseline and post-retrofit energy consumption. Actual energy savings are calculated with a unique combination of computer hardware, energy and data translation software, measurement protocols, and digital remote sensing equipment which monitor the energy consumption of the retrofit environment and a sample baseline environment.

18 Claims, 7 Drawing Sheets

SYSTEM AND METHOD FOR ENERGY MEASUREMENT AND VERIFICATION WITH CONSTANT BASELINE REFERENCE

FIELD OF THE INVENTION

This invention relates to the field of energy measurement and verification. More particularly, it relates to a system and method for accurately measuring and verifying energy savings in real time at a customer facility.

BACKGROUND OF THE INVENTION

Increasing attention has been focused on energy conservation efforts. These efforts arise from a common desire among both energy consumers and energy providers to develop strategies which promote energy savings. With greater frequency, consumers demand more energy efficient equipment and energy-saving materials as they construct new facilities and retrofit existing facilities. For their part, energy providers offer various incentives to encourage more efficient energy usage by their customers.

Currently, many energy providers offer incentive programs in which a utility buys back unused energy or energy savings that result from use of high-efficiency measures. With these programs, the payback is based on the amount of energy savings through such techniques as lighting retrofits and replacements of high-energy equipment with more efficient models. Even in the absence of such incentive programs, the cost savings of these techniques alone may justify the capital expenditure required for their implementation.

The attractiveness of such incentive programs has helped encourage the development of so-called energy services companies ("ESCOs"). ESCOs generate millions of dollars worth of revenue by implementing energy conservation programs on behalf of customers, such as federal agencies, state and municipality governments and various private sector entities. In many cases, these companies are willing to outlay the capital costs of an energy retrofit in return for a portion of the resulting energy savings revenue (known as "shared savings"), such as that available through energy rebate programs or demand side management (DSD) programs.

An obstacle to the wholesale adoption of existing energy saving measures (as well as to more rapid and profitable development of the ESCO industry) is the inadequacy of current methods of measuring and verifying energy savings associated with many existing energy conservation measures. In the absence of a quantifiable measure of energy savings, many customers are unwilling to incur the capital costs and other expenses associated with retrofitting an existing facility. Similarly, because the financial payback to the ESCO is essentially dependent on a quantifiable amount of energy savings provided to the customer, inadequate energy measurement and verification precludes application of many energy conservation materials in shared savings ventures.

The inadequacy of current measurement and verification techniques is essentially due to the fact that these techniques generally require assumptions as to the energy consumption of the "baseline" environment. More particularly, in order to calculate the energy savings from a retrofit of a given facility, one must calculate the energy consumption of the retrofit environment and subtract this value from the energy consumption of the same environment as it would exist without the retrofit (that is, the "baseline" environment). It is straightforward to monitor actual energy consumption of the retrofit environment. However, since the baseline environment is lost, the energy consumption associated with the baseline environment can only be estimated or compared to a previous year.

In some cases, the hypothetical energy consumption of the baseline environment can be estimated with relatively acceptable accuracy. For example, if the retrofit involves replacement of lights having relatively invariant energy consumption characteristics, the savings of a retrofit with more efficient lights are fairly easy to determine accurately based on the actual use of the newly installed lights. However, where other energy conservation techniques are applied which are less predictable, the accuracy of estimated energy consumption of the baseline environment becomes much less reliable.

For example, a given facility's energy consumption for HVAC (heating, ventilating, and cooling) is greatly affected by such factors as the difference in ambient temperature inside and outside the facility and the thermal characteristics of exterior structures such as windows, roofs, and walls. These factors may vary in ways difficult to model for purposes of calculating baseline energy consumption. Daily temperature differences vary greatly with changing weather conditions and other conditions such as the shade afforded to the facility and the number and behavior of the occupants within the facility. Moreover, as different materials are used or as variations occur within the same type of materials, variations are introduced with respect to the thermal characteristics of the structure defining the exterior of the facility.

Conventional methods attempt to take these variables into account, but such models are prone to inaccuracy. For example, it is known to model the weather conditions at a facility based on historical data for the region. The model may be adjusted to account for actual variations in outside temperature by use of "degree day" calculations wherein the difference of the average outdoor temperature from a base temperature, for example, 65° F. However, with wide fluctuations in daytime and nighttime temperatures, degree day adjustments become rough approximations at best. Other factors, such as those noted in the preceding paragraph, may even be more difficult to take into account in modeling the baseline. For example, even minor adjustments in room thermostats by facility occupants can greatly affect the accuracy of baseline models.

More sophisticated measurement and verification systems are known which may provide more accurate estimates of energy savings under certain conditions. However, these systems are primarily designed for technical analysis and monitoring during product research and development, rather than for permanent installation at an application site. Accordingly, they may fail to take into account the various factors affecting energy savings calculation. Equally significant, such scientific monitoring systems are generally not suitable for real time energy savings measurements in commercial applications. For example, many are not designed to record their measurement in a format which can be readily connected to existing building control systems. Further, the cost of these devices alone may exceed the cost of an entire energy saving retrofit installation.

In summary, current energy measurement and verification methods are perhaps best characterized by the United States Department of Energy Office of Federal Energy Management Programs, in its *Measurement and Verification Guidelines for Federal Projects* (Feb. 1996). This publication states: "All of the methods for determining energy savings are based on the same concept; namely, energy savings are derived by comparing the energy usage after the retrofit to what the energy usage would have been without the retrofit (i.e. the baseline). It is relatively easy to measure post-retrofit consumption. However, it is impossible to 'measure' what energy usage would have been, therefore, it is impossible to 'measure' energy savings. Energy savings can only be determined based upon assumptions about the baseline." (Emphasis added.)

It is clear that the limitations inherent in these existing techniques significantly hinder the greater use of existing energy savings measures and lessen the incentive for development new technology that would enhance energy conservation efforts. In particular, retrofits arising from shared energy savings ventures, such as those in which ESCOs take part, often do not take advantage of many energy savings materials now available because of the difficulty in accurately determining resulting energy savings. For example, energy saving window treatments have not been widely applied in retrofits because of potential disagreement between the ESCO and the customer over actual cost savings from the use of such materials. Many other materials well known to provide significant energy savings, such as roofing insulation, are likewise avoided by shared savings ventures for the same reasons.

In view of the foregoing, a need exists to develop a energy measurement and verification technique which is accurate, easily integrated with conventional control systems, and sufficiently inexpensive so as not to outweigh the potential cost return of the energy conservation measures being monitored. A related need exists to provide an energy measurement and verification technique that preserves the conditions of a baseline environment.

SUMMARY OF THE INVENTION

It is an object of the invention to meet this need and others. The inventive energy measurement and verification system and method disclosed herein overcomes the limitations of existing monitoring systems by providing real time documentation of both baseline and post-retrofit energy consumption. Actual energy savings are calculated with a unique combination of computer hardware, energy and data translation software, measurement protocols, and digital remote sensing equipment which monitor the energy consumption of the retrofit environment and a sample baseline environment.

More specifically, the inventive technique includes a system and method for measuring the energy savings in an environment to which one or more energy saving materials has been applied. According to this technique, at least one temperature sensor is used to measure a first sample region which is representative of the environment prior to retrofitting with the energy saving material (i.e., a baseline sample). At least a second temperature sensor is used to measure a second sample region which is representative of the environment after retrofitting with the energy saving material (i.e., a retrofit sample). A processing device, (for example, a personal computer, laptop computer, or server) calculates the energy savings provided by the energy saving material on the basis of temperature readings from the temperature sensors.

According to one aspect of the invention, energy savings is calculated based upon the following expression:

$$Q_{SAVINGS} = (t_B - t_R)hA$$

where $(t_B - t_R)$ is the temperature difference between the first sample region and the second sample region, h is the heat transfer coefficient of the region surrounding the temperature sensors, and A is the area of the environment to which the energy saving material has been applied.

According to another aspect of the invention, the energy savings materials may comprise a film that is applied to one or more windows. Alternatively, the energy savings materials may comprise insulation that is applied to a roof, floor or wall.

According to still another aspect of the invention, several pairs of temperature sensors are provided throughout a given environment and energy savings is calculated on the basis of plural measured temperature differences.

According to yet another aspect of the invention, each temperature sensor provides an output signal in a digital format which readily interfaces directly with standard commercial building control computer systems, such as PC-based systems, to provide remote monitoring of both baseline conditions and conditions existing after retrofitting with more energy efficient equipment and materials.

In addition to the above-noted features, particular embodiments of the invention may be adapted to implement energy reduction techniques, such as load shedding. According to this feature, a system controller may be used to automatically scale back or turn off heating or cooling in specific areas on the basis of data which is indicative of environmental conditions. This application may be advantageously combined with other energy savings techniques applied to a new or preexisting site to obtain more energy efficiency.

Other novel aspects and features of the invention will be apparent from the detailed description set forth below.

DETAILED DESCRIPTION OF THE PREFERRED EMBODIMENTS

The inventive technique is based on a novel paradigm for measurement and verification of energy savings. By preserving a representative sample of the baseline conditions, actual energy savings can be calculated and documented on a real time basis and be self-adjusting for the variables which affect baseline energy consumption.

The following discussion illustrates this technique by reference to a system and method for measuring and verifying the energy savings achieved by application of a film to several windows. It should be understood that this particular application is illustrative. Other embodiments of the invention, including those specifically mentioned below, will be apparent to those skilled in the art. For example, the discussion below refers to summer or cooling season conditions. It will be appreciated that the technique applies equally as well to winter or heating season conditions.

Figure 1A:
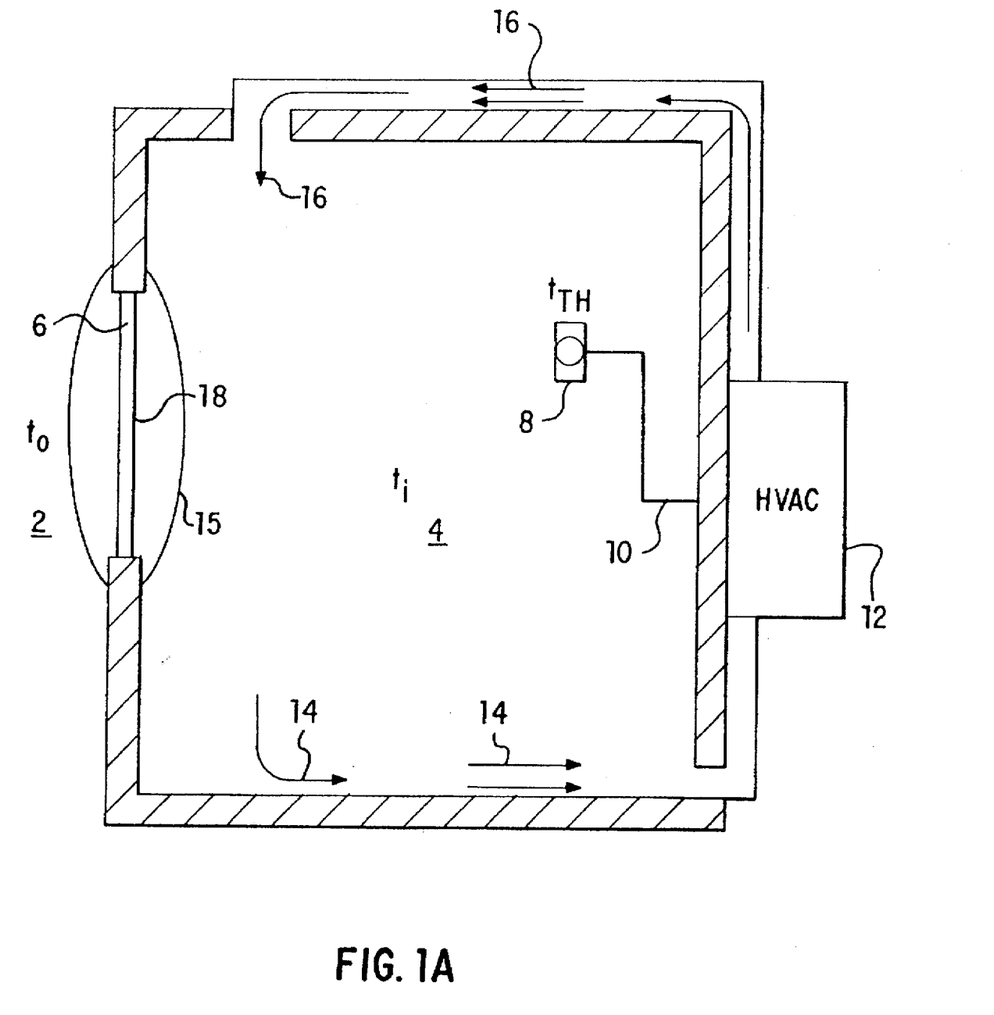
FIG. 1A to 1C illustrate general features of the invention in reference to a first embodiment of the invention.
Figure 1B:
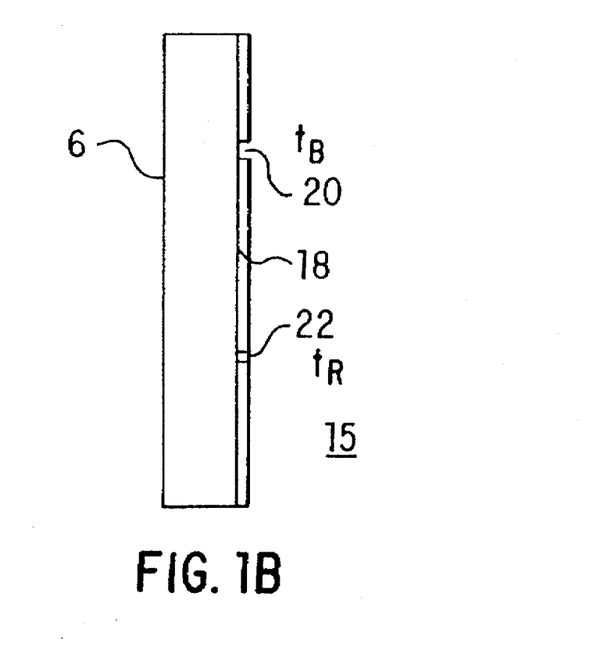
Figure 1C:
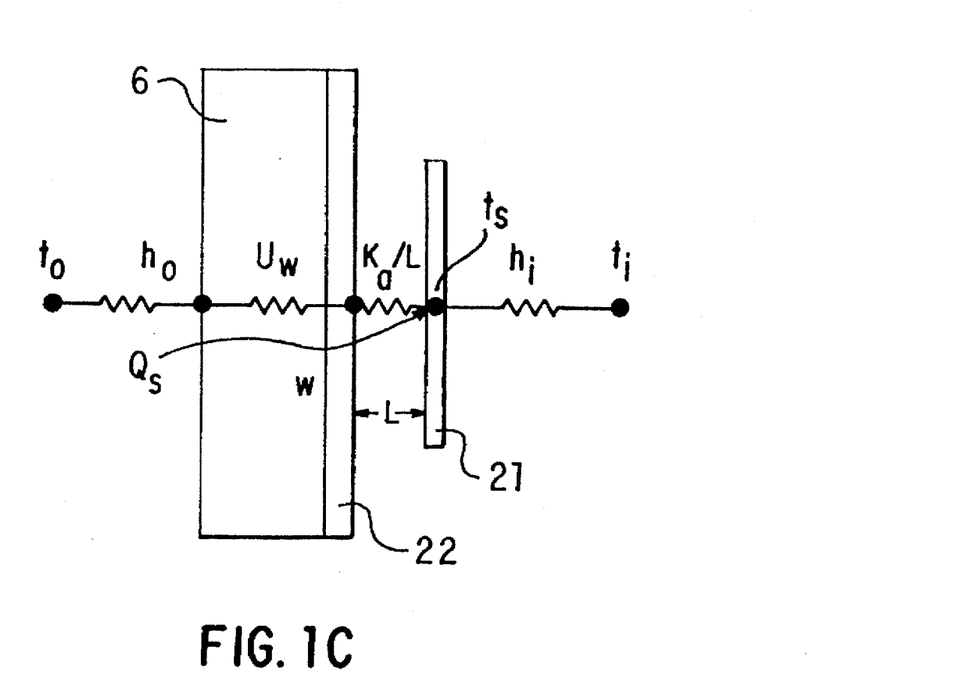

FIGS. 1A to 1C illustrate general characteristics of the invention in reference to a first embodiment of the invention.

In FIG. 1A, an outdoor environment 2 and a closed indoor environment 4 are separated, in part, by a structure, such as a window 6 (not drawn to scale). A thermostat 8 is located in the indoor environment 4 and sends a control signal through a wire transmission medium 10 to a HVAC system 12 when the measured indoor temperature $t_{th}$ at the thermostat 8 rises above a set point. Based on this control signal, the HVAC 12 removes warmer air 14 from the indoor environment 14 and resupplies cooler air 16 until the temperature $t_{th}$ falls below the set point. Of course, when the outside temperature $t_o$ is less than the inside temperature $t_i$ (for example, in winter), the thermostat 8 and HVAC 12 supply warmer air to maintain a set point temperature. Although simplified for purposes of this explanation, this environment is representative of a building, residence or other environment in which the present invention may be applied.

In this example, the window 6 in the drawing is almost entirely covered by an insulating and/or reflective material 18 which affects the overall energy related characteristics of the window 6. For example, this material 18 comprises an energy saving film. Accordingly, the drawing illustrates what is referred to herein as a retrofitted environment, that is, one in which one or more energy saving measures have been applied. As a result of the application of the film 18, the energy expended by the HVAC system 12 to maintain the set point temperature will be less within the retrofitted environment than otherwise would be expended had no energy savings measure been implemented. The present invention provides a technique for measuring this energy savings.

As best seen in the exploded view of the area 15 surrounding the window as shown in FIG. 1B, a small area 20 of the window 6 is left untreated by the film 18. This area 20 is representative of the energy characteristics of the original environment. It serves to preserve the original baseline conditions even after retrofitting with the insulating/reflective material, and is an example of what is referred to hereinafter as a baseline sample.

A second area 22 is designated on the surface portion of the window 6 which is treated with the film 18. This second area 22 is equal in size to the above-noted baseline sample 20. This second area 22 is an example of what is referred to herein as a retrofit sample, that is, a sample of the retrofitted material.

When $t_o > t_i$, the resulting temperature differential produces heat flow from the outside to the inside through the composite structure. The heat introduced to the indoor environment is equal to the heat removed by mechanical means (i.e., the HVAC system). As a result of the action of the HVAC system, the baseline sample 20 and the retrofit sample 22 are representative elements of two heat transfer systems which remain in equilibrium over relevant time periods. That is, while heat flow through the composite structure will vary as the inside and outside temperature difference changes, the two heat transfer systems remain in a relative equilibrium over the time periods during which measurements are taken.

Of course, the system will also be maintained in equilibrium where $t_o < t_i$. In this case, the direction of heat flow is from the inside to the outside through the composite structure. The heat lost from this process is equal to the heat added by mechanical means (i.e., the HVAC system). Again, the baseline sample 20 and the retrofit sample 22 are representative elements of two heat transfer systems which remain in equilibrium over relevant time periods.

Because the baseline sample 20 and the retrofit sample 22 have different thermal characteristics, the respective heat transfer rates between the indoor and outdoor environments at these areas will differ. Consequently, a measurable temperature difference exists between these two regions. This temperature difference may be represented by $(t_B - t_R)$, where $t_B$ is the temperature at the baseline sample and $t_R$ is the temperature at the sample portion of the retrofitted composite structure.

The rate at which the heat flow at the two sample points 20 and 22 is transferred into the interior environment is primarily dependent upon the thermal convection of air within the environment. Since it is intended to monitor the energy savings of the improvement relative to the baseline, it is not necessary to calculate individual heat flows at each sample location 20 and 22. Instead, it is only necessary to calculate the difference in heat introduced into the indoor environment by the baseline sample and the retrofitted sample.

Mathematically, the heat flux $q_B$ at the baseline sample and the heat flux $q_R$ at the retrofitted sample may be represented as follows:

$$q_B = (t_B - t_i)h \qquad (1)$$

$$q_R = (t_R - t_i)h \qquad (2)$$

where:

$t_B$=Temperature at the baseline sample;

$t_R$=Temperature at the retrofit sample;

$t_i$=Temperature of the indoor environment.

h=The heat transfer coefficient of air (or material) surrounding the samples.

The heat differential $q_D$ (in BTUs per hour per square foot) is:

$$q_D = q_B - q_R \qquad (3)$$

Substituting equations (1) and (2), we find:

$$\begin{aligned} q_D &= (t_B - t_i)h - (t_R - t_i)h \\ &= (t_B - t_i - t_R + t_i)h \\ &= (t_B - t_R)h \end{aligned} \qquad (4)$$

Thus, the energy flux difference between the baseline sample and the retrofit sample is provided by the difference in temperature between the two samples. This quantity may be multiplied by the total surface area of the retrofit, $A_w$, in order to determine the net energy savings. Since the baseline sample area is relatively small in comparison with the area of the retrofit glass, it does not significantly affect the operation of the system. Thus, the energy savings obtained by the retrofit, $Q_{SAVINGS}$ is:

$$Q_{savings}=(t_B-t_R)hA_w \qquad (5)$$

Specific examples for measuring energy savings in a variety of applications are set forth below. In these examples, at least two temperature sensors measure the temperature difference $t_B-t_R$. FIG. 1C demonstrates that the manner by which temperature sensors can be used to measure energy savings accurately according to the relationship expressed in Equation (5).

FIG. 1C is a circuit diagram of a heat transfer system, such as shown in FIGS. 1A and 1B. Specifically, it illustrates a temperature sensor 21 which is disposed a distance L from a retrofit sample 22 of a window.

The overall heat flux, $q_{room}$, through the window 6 and film 18 to the room is:

$$q_{room}=\tau_w Q_s+[(t_o-t_i)/(1/h_o+1/U_w+1/h_i)] \qquad (6)$$

where $\tau_w$ is solar transmissivity through the window as reported by the manufacturer, $Q_s$ is total solar load, $t_o$ and $t_i$ are outside and inside temperatures, $h_o$ and $h_i$ are outside and inside heat transfer coefficients, and $U_w$ is the universal heat transfer coefficient as reported by the manufacturer. The heat transfer coefficients include both a convective term (based on orientation and air speed) and a radiative term (based on emissivity and temperature differential).

The same heat flux can be split into two equivalent heat fluxes from outside through window to sensor and from sensor to room. The heat flux from outside through the window to the sensor can be expressed as:

$$q_{room}=\tau_w\alpha_s Q_s+[(t_o-t_s)/(1/h_o+1/U_w+L/k_a)] \qquad (7)$$

where $\alpha_s$ is the solar absorptivity of the sensor, $t_s$ is the sensor temperature (as measured), $k_a$ is the conductivity of air, and L is the gap between the window and the sensor.

The heat flux from the sensor to the room can be expressed as:

$$q_{room}=(t_s-t_i)h_i \qquad (8)$$

It will be appreciated that Equations (6), (7), and (8) are equivalent due to the series heat flux path shown in the thermal circuit of FIG. 1C. The complicated heat flux from outside to inside is easily measured without knowledge of all of the input parameters required for Equations (6) or (7). Instead, the minimal parameters of Equation (8) (multiplied by $A_w$) will suffice. The temperature $t_s$ is measured with the sensor, $t_i$ is the indoor set point temperature, and $h_i$ is the indoor heat transfer coefficient that can be obtained from tables such as the ASHRAE Handbook (e.g., h=1.46 Btu/hr-ft²-F).

In fact, since we are not interested in the absolute heat rate through the window, but instead the relative or differential heat rate of Equation (3) (i.e., $Q_{room,B}-Q_{room,R}$), the set point temperature is not required. Thus, as indicated with Equation (5), $(Q_{room,B}-Q_{room,R}=(t_B-t_R)h_iA_w)$, and so the only manual inputs required are the window area and the heat transfer coefficient. The sensor temperatures may be automatically measured and applied in the manner described below.

Figure 2:
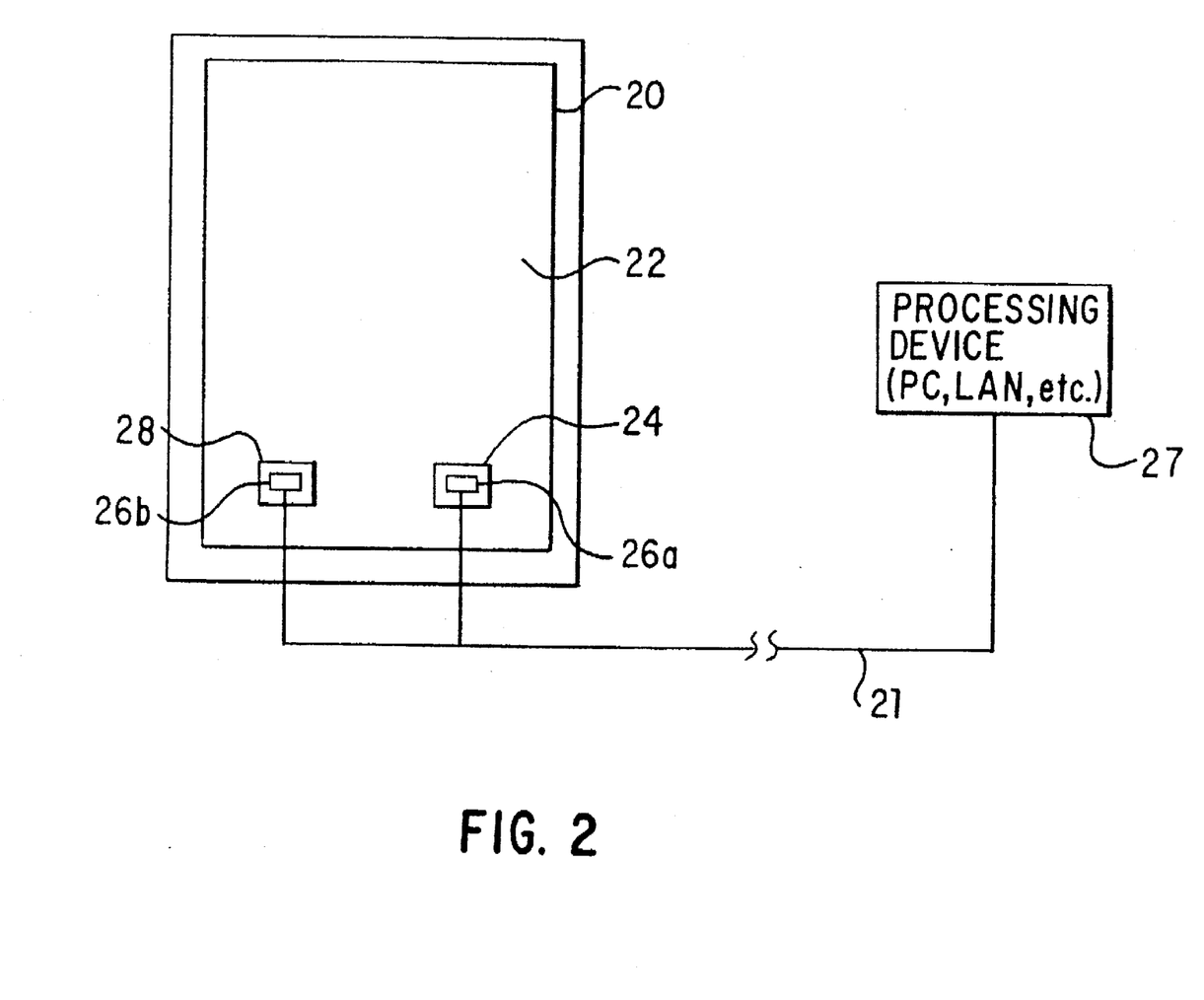
FIG. 2 is a view of remote sensing architecture for measuring respective temperatures of a baseline sample and retrofit sample of a window to which energy savings film has been applied.

FIG. 2 illustrates an embodiment of the invention specifically adapted for use as an energy measurement and verification window film retrofit monitor. Similar to the embodiment shown in FIG. 1A, a window 20 is illustrated which has been "retrofitted" by the application of a window film 22. The film 22 may comprise any commercially available material intended to affect the energy related characteristics of the window 20. For example, Scotchtint™, Sun Control, and All Season films offered by 3M™ are known to provide treated windows with improved thermal insulation and to increase the reflectance of the surface area. In FIG. 2, the surface area of the window film 22 is shown as a smaller rectangular area within the area of rectangular window 20.

As shown, a relatively small area of the window 20 is left untreated to form a baseline sample 24. For example, the baseline sample 24 may be one in which the film 22 is removed to reveal a portion of the original window surface. Although illustrated as a larger region to better illustrate the invention, the area of the baseline sample 24, $A_B$, should in fact be relatively small in comparison with the total area of the window $A_W$ so as not to detract from the efficiency obtained by the retrofit. In other words:

$$A_W \gg A_B$$

or $$A_W-A_B \approx A_W$$

The baseline sample 24 is representative of the energy characteristics of the original environment. It thus serves to preserve the original baseline conditions even after retrofitting with the window film 22.

A pair of calibrated temperature sensors 26a and 26b are attached respectively in the vicinity of the baseline sample 24 and to an area 28 on the retrofitted surface. These temperature sensors 26a and 26b measure the respective temperatures $t_B$ and $t_R$ described above in reference to FIG. 1A, thereby providing signals representative of the temperature of the retrofitted environment as well as the baseline environment. The temperature sensors 26a and 26b output temperature signals over wire 21 to a processing device 27, such as a computer. Depending on the distance and other factors known to affect signal quality, the temperature signals may be provided to a standard parallel port of a conventional computer that is programmed in accordance with the method described herein.

In the embodiment shown in FIG. 2, the precise placement of the temperature sensors 26a and 26b relative to the samples 24 and 28 will vary depending on particular conditions found within the environment to be monitored. Generally, it is necessary to place the temperature sensors 26a and 26b sufficiently close to the samples 24 and 28 so as to fall substantially within the same temperature gradient as the air surrounding the sample to be monitored. It has been found that a separation of about 0.5 inches from the surface of the sample to be measured provides accurate results.

The type of sensor may also vary depending upon the application. As a general matter, any temperature sensing device or combination of devices that is (are) capable of providing a temperature indicating signal can be used in connection with the inventive technique. While a number of commercially available analog devices and digital thermometers made of discrete components can be used, each has inherent characteristics which may affect the implementation of the invention. For example, it is possible to utilize analog sensors to measure the temperature at each of the areas of the window indicated above. However, analog signals may be more prone to transmission errors which may become more pronounced as the distance to the processing location increases. Moreover, the use of analog signals generally requires conversion to digital form at the processor location.

While many alternative configurations for the sensor may be possible, we have discovered that digital sensors are particularly advantageous when utilized in connection with the system and overcome the inherent limitations of analog devices and sensors constructed from discrete components. Such devices provide temperature readings with sufficient accuracy in a format which is less susceptible to signal degradation and which is easily compatible with conventional processing devices, such as personal computers, portable computers, or servers in a network environment.

The preferred embodiment utilizes a single integrated circuit (IC) digital thermometer of a type now available commercially. For example, a digital temperature sensor manufactured by Dallas Instruments, part number DS 1620, is ideally suited for use with the inventive technique. Digital sensors of this type generally include temperature measurement components, such as a thermistor, and analog to digital conversion circuitry. They may also include memory components and addressable registers, permitting several of such devices to be connected together in a network. Of course it should be understood that other sensing devices may be utilized in a similar or equivalent manner to provide the same functionality.

An advantage of using a chip of the type described above is that the it typically does not require external components, allowing the final sensor packaging to be very small and unobtrusive. The preferred sensor also provides a digital signal in a conventional format, such as a 9 bit format, which is indicative of temperature readings. A conventional digital format facilitates connection to personal computers (PCs) or building control systems and is not platform dependent (that is, the signal can be read by many commercially available computer system, including, but not limited to, DOS/Windows based machines, Macintosh systems, Sun systems, and Unix-based systems). Since many newer building control systems, such as those manufactured and installed by Honeywell, Johnson Controls, and Powers, utilize the DOS/Window-based PCs for graphics displays and data terminals, this format has widespread applicability. Integration with many other systems are also readily supported.

Other advantages are also provided by use of a digital temperature sensing device. For example, the system may be integrated with a thermostat to allow load shedding functions and to provide additional energy savings beyond those realized by the envelope improvements being measured and validated. Other configurations allow multidrop or mini-LAN capabilities within the chip itself. This feature facilitates wiring of the energy measurement and verification system in buildings where multiple exposures are being monitored and a building control system or LAN is unavailable.

Various wiring architectures can be utilized to transmit the temperature signals detected by the temperature sensors depending upon which particular type of sensor is utilized. For example, the Dallas Instruments sensors noted above can transmit signals over a three wire configuration or a single wire configuration. Such chips require either a 3 or 5 volt power supply and can be wired as a parasite to draw operating voltage from data communication wiring. This flexibility allows integration of the system according to the invention into a variety of buildings and building control systems. Of course, wiring will be customized as necessary to fit each installation.

Unlike the prior model-based techniques described previously, the architecture shown in FIG. 2 is inherently self-adjusting in that it accounts for factors which otherwise must be estimated. This advantage results from use of calibrated temperature sensors that directly measure temperatures of both the retrofit and baseline samples. The retrofit measurement achieves the new energy savings temperature while the baseline sensor maintains the original (non-retrofit) temperature. Additionally, the technique provides energy measurement and verification in real time. Accurate net savings may be obtained by sampling temperature measurements at discrete times and integrating over a time interval to provide instantaneous, hourly, daily, seasonal, and yearly energy savings.

Figure 3:
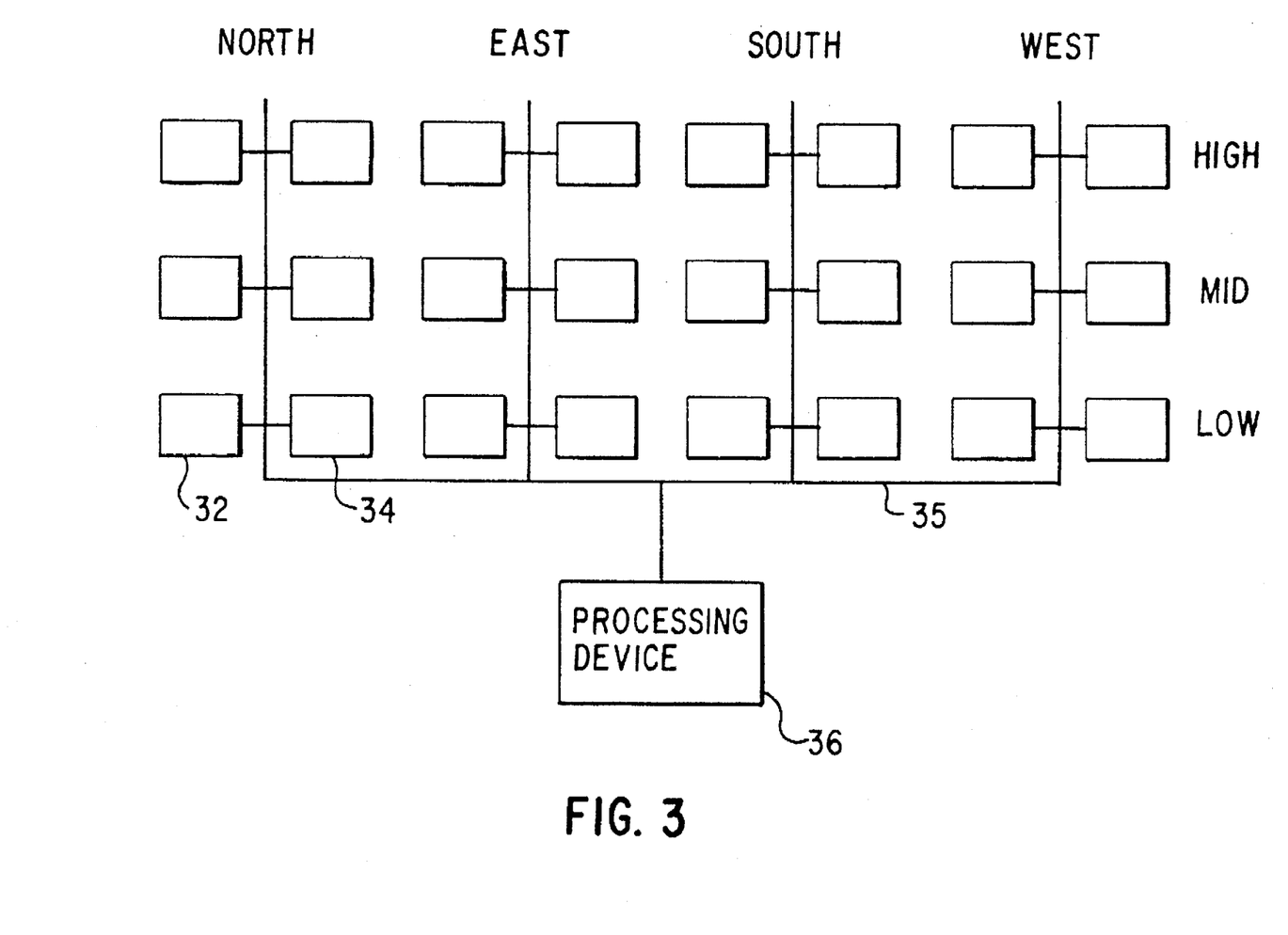
FIG. 3 is a diagram of a multiple sensor pair configuration for measuring energy savings in a building in accordance with an embodiment of the invention.

FIG. 3 illustrates an embodiment of the invention in which multiple sensor pairs (baseline sensors 32 and retrofit sensors 34) are utilized to monitor a larger environment than the environment shown in FIGS. 1 and 2. As shown, multiple sets of sensors may be provided at various locations within a structure. For example, a sensor pair may be provided respectively at low, mid and high level floors of a building and at each of four exposures (north, east, west, and south). Each of the sensors may be coupled along a common signal path 35 to thereby form a network under control of a central processing device 36.

The configuration illustrated in FIG. 3 permits more accurate estimation of the total energy savings within an entire building. It permits detection of different rates of energy within different areas of an environment which may result from fluctuations in conditions that affect energy savings.

This embodiment of the invention also may be applied in connection with load shedding applications. Load shedding may be implemented by monitoring the temperature with the sensors to adjust the building HVAC with respect to portions of the building that are subjected to variations in conditions. While such an application may not be preferable to a standard configuration of room thermostats (due to the placement of the sensors near a window), the sensors could be used to provide early indication of environmental variations before they affect the general environment. For example, the central controller may detect a decrease in sunlight which would reduce the need for cooling within a building, and accordingly decrease the flow of cooled air to the affected areas.

As FIG. 3 suggests, various other modifications and alternate embodiments of the invention are possible. Increased accuracy may be obtained by increasing the number of baseline and retrofit sample pairs. For example, taller buildings may require more sample pairs depending upon shading from adjacent buildings. Generally, the number and placement of sample pairs will be customized for each location dependent upon such factors as desired accuracy and variations within the environment.

Now that examples of the energy measurement and verification system have been described, an illustrative methodology by which the temperature signals are processed is now set forth.

As noted above, the preferred means for processing the temperature signals for each sample is a suitably programmed computer. Of course, implementation of the invention is independent of the particular hardware platform which processes this data. In fact, the invention may be implemented by use of a portable microcomputer, a "desktop" personal computer, a workstation connected in a network, or through any other comparable device or combination of devices.

Figure 4:
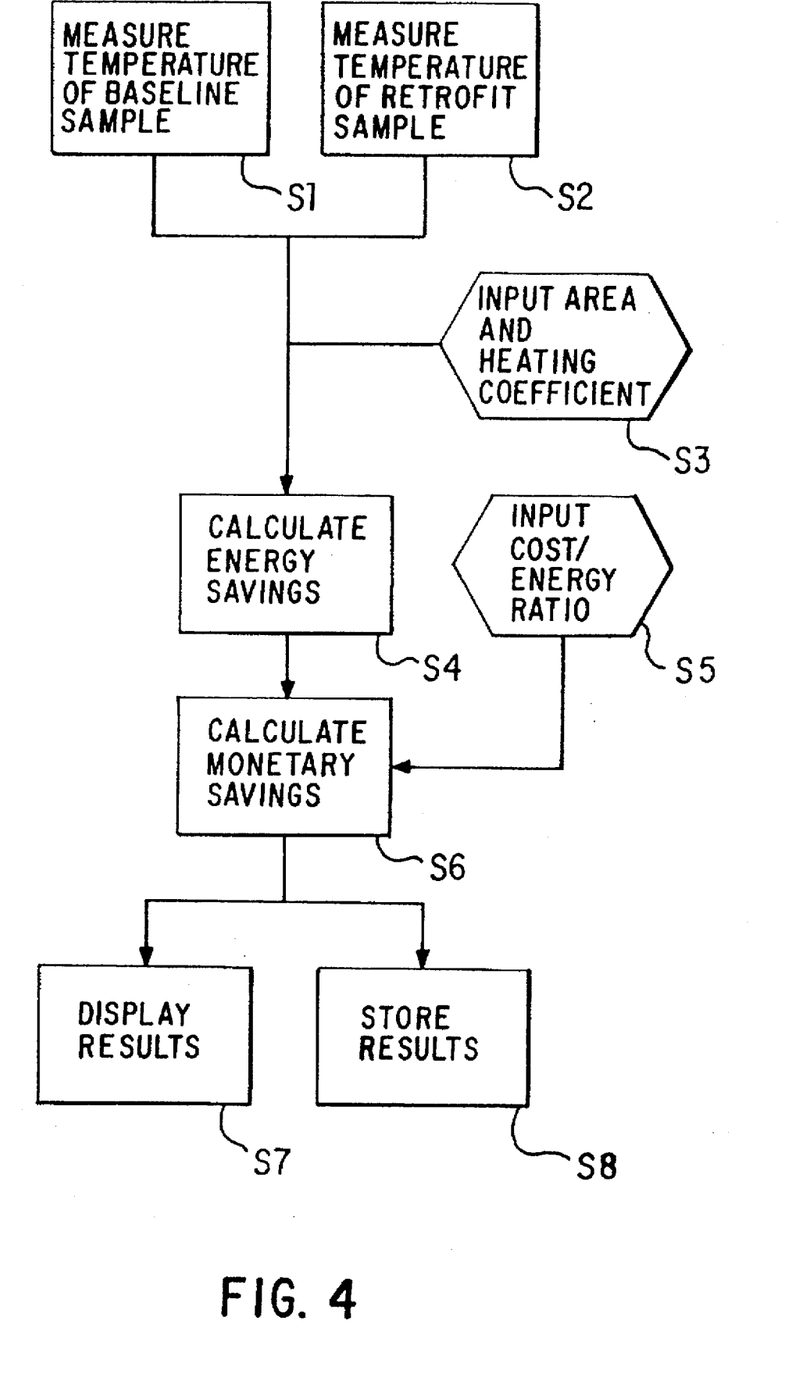
FIG. 4 is a flow chart illustrating the steps by which energy savings may be determined from measured baseline and retrofit sample temperatures.

FIG. 4 is a flow diagram which illustrates the method of operation for the system. As shown, at steps S1 and S2, the temperature of each baseline sample $t_B$ and each retrofit sample $t_R$ are read. Depending on the specific configuration of the sensors and the processing device, these steps may be performed simultaneously or sequentially, for example, by successively strobing enable pins on a digital temperature sensor.

At step S3, the values for the retrofit window $A_W$ and for the heat transfer coefficient h are input. The h value may be calculated as a constant, manually updated, or automatically updated internally through a self-calibrating algorithm programmed into system software to ensure accuracy of the calculations.

On the basis of the values obtained in the preceding steps, the energy savings provided by the retrofit is determined at step S4. As described above, the energy savings for each sensor pair may be expressed as $(t_B-t_R)hA_W$. Based on these values, the total energy savings may be calculated for the entire retrofit environment.

Optional steps are illustrated in FIG. 4 for further processing of the information obtained at step S4. At step S5, the average cost per unit energy is provided to the processing device. Based on this value, the total monetary savings can be calculated.

As indicated at step S7, any of the values computed above, or any other values derived therefrom, may be displayed to a user in any manner desired. For example, the total energy savings may be displayed on a workstation monitor, may be printed in a report or otherwise processed as known in the art.

Similarly, at step S8, the values calculated above or other values derived therefrom are stored. For example, the total energy savings over a given period of time may be stored and then processed by an ESCO to determine any cost savings that is owed by a customer in return for a retrofit.

Figure 7:
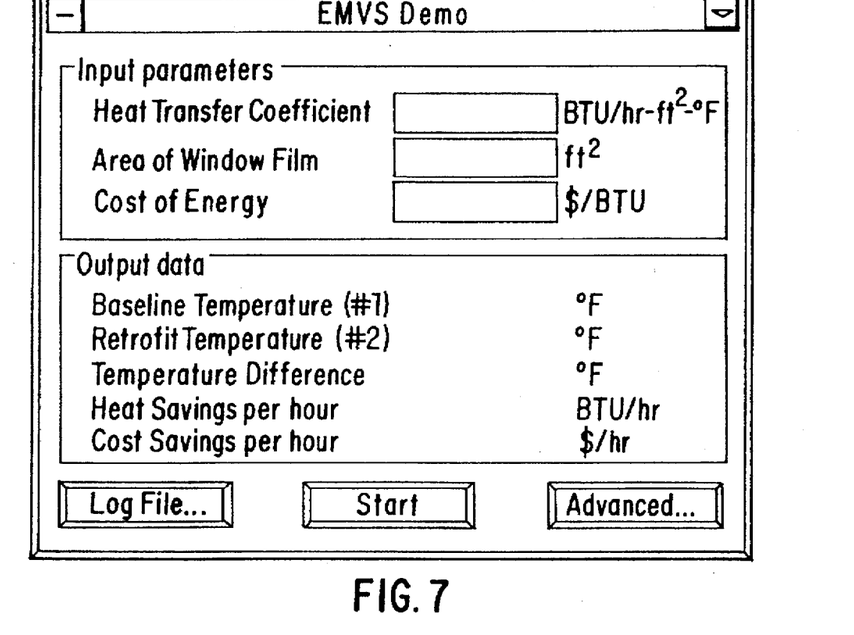
FIGS. 7 and 8 are diagrams of screens generated on a computer monitor which are utilized to input parameters for measuring energy savings according to an embodiment of the invention.
Figure 8:
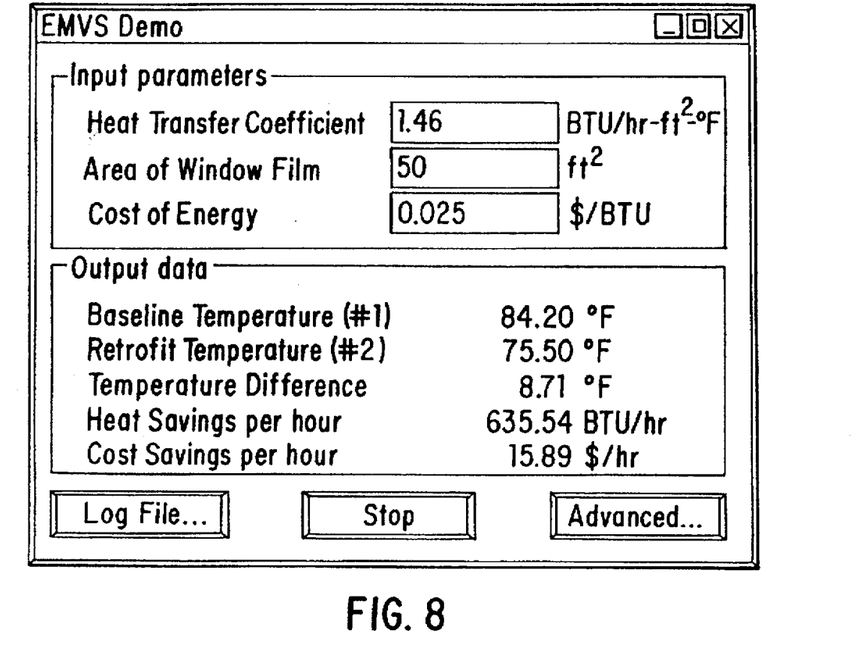

FIGS. 7 and 8 illustrate an interface for a program developed in accordance with the invention. The program is utilized to receive necessary parameters to calculate energy savings and also to control a pair of temperature sensors which measure the temperature of a baseline sample and a retrofit sample. In this example, a pair of DS1620 sensors are utilized to generate temperature signals which are received at a conventional parallel port of a portable computer. The temperature readings are then processed to measure energy savings.

In the example shown in FIG. 7, the user is prompted to enter the "h" coefficient, the window film area (which is approximately $A_W$), and the energy cost. These values may be stored temporarily, but the valves could also be retained for subsequent runs. Preferably, a default set is used for initial start-up (e.g., an h value of 1.46 Btu/hr-ft$^2$-F, an area of 1 ft$^2$, and a nominal electrical cost for air conditioning).

The temperature $t_B$ of a first baseline-measuring sensor and the temperature $t_R$ of a second retrofit-measuring sensor are probed simultaneously and continuously. In this example, the sensitivity of the sensor measurement is 0.5° C.; thus, the measurement is accurate to within 0.9° F. The heat savings and cost savings for the retrofit are displayed in FIG. 8 as the instantaneous values at this time.

In the examples, shown in FIGS. 7 and 8, there is a button for a log file which may be used to tabulate time versus temperature, heat savings, and cost savings. For the cost of energy input field, a pull down menu may be used for various heating/cooling fuels and systems so that the user can choose the appropriate energy usage. The "advanced" button may be used to access enhanced features, such as "h" coefficient internal computation, software calibration of sensors, adjustable frequency time/temperature logging, time-integrated "average" value displays (i.e., hourly, daily, seasonally, yearly), a cost of energy worksheet for establishing local energy rates for the building system, as well as possible load shedding or thermostatic functions.

Although a particular example has been described, it will be appreciated that calculation and display of energy savings can be implemented in any of a number of ways. For example, the data read from the sensors could be stored and then input to a conventional spreadsheet program. Alternatively, the processing could be implemented with other specialized, custom-designed software.

In view of these examples, it will also be appreciated that the invention provides real time documentation of actual energy savings provided by various energy saving techniques and materials, such as window treatments. The sensors obtain actual heat transfer data from one or more sample pairs and takes into account continuously varying ambient temperatures.

The inventive technique also takes into account a variety of other conditions which require complicated or unreliable estimation. For example, actual solar heat gain from diffused and direct solar radiation is measured directly at representative samples, whereas in previous methods, solar heat gain is factored in as an estimated value.

As will be appreciated, the inventive technique may be utilized in a wide variety of applications apart from those described above. In particular, it may be implemented to monitor energy savings from any facade, fenestration, roofing, or flooring treatment. Thus, energy savings by application of roofing insulation, facade insulation, and various fenestration treatments may be calculated.

Figure 5:
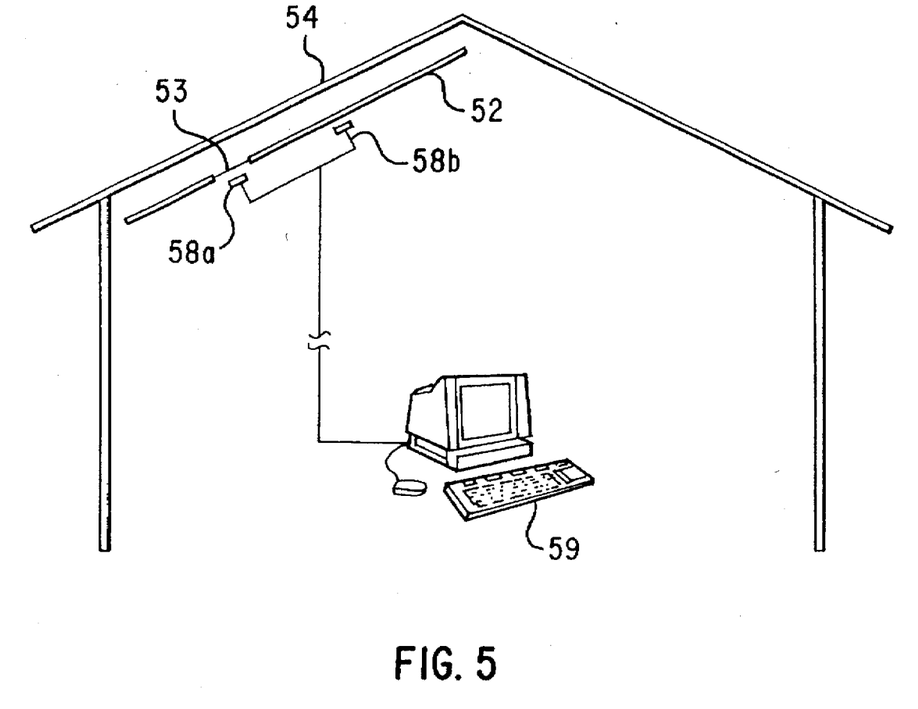
FIG. 5 illustrates an application of the energy measurement and verification system according to the invention to monitor the energy savings obtained by application of roofing insulation in a residential setting.

FIG. 5 illustrates an application of the energy measurement and verification system to monitor the energy savings obtained by application of roofing insulation in a residential setting. A cross-section of a conventional pitched roof 54 is shown wherein new insulation 52 has been applied under preexisting insulation 53. A portion of the new insulation is removed to preserve a sample of the baseline environment. Temperature sensors 58a and 58b are applied to measure the temperature of the baseline sample and a sample of the retrofit environment obtained by application of the insulation system. The respective temperature signals are supplied to a processing device 59, which may comprise a conventional home PC.

Figure 6:
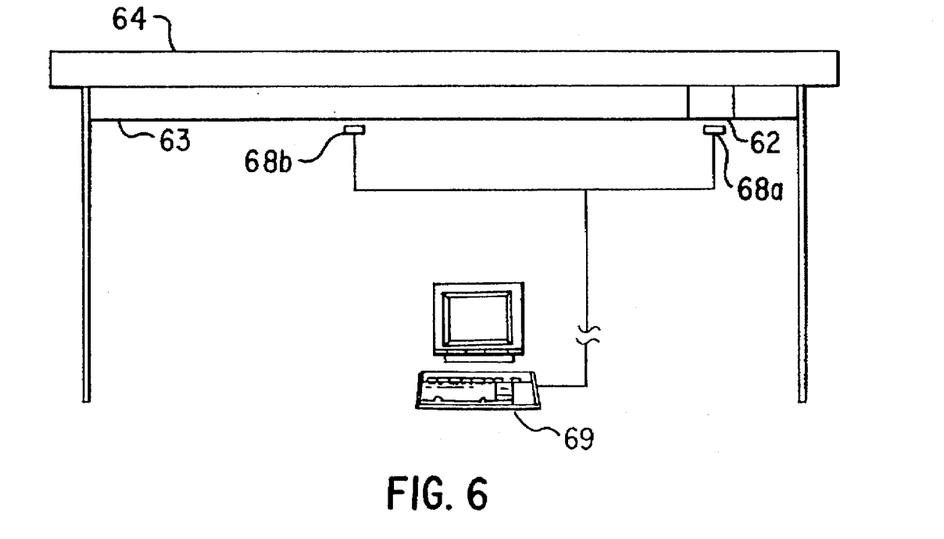
FIG. 6 illustrates an application of the energy measurement and verification system according to the invention to monitor the energy savings obtained by replacement of old roofing insulation with new roofing insulation in a commercial setting.

FIG. 6 illustrates an application of the energy measurement and verification system to monitor the energy savings obtained by replacement of old roofing insulation 62 with new roofing insulation 63 in a commercial setting. A cross-section of a commercial building roof 64 is shown. A portion of the old insulation 62 is maintained in place to preserve a sample of the baseline environment. Temperature sensors 68a and 68b are applied to measure the temperature of the baseline sample and a sample of the retrofit environment obtained by replacement of the old insulation system. The respective temperature signals are supplied to a processing device 69, which may comprise a dedicated building computer system or a conventional stand alone PC.

As these embodiments illustrate, the energy measurement and verification system may be utilized to determine energy savings for a wide variety of energy savings techniques. For example, the technique can be applied to monitor energy savings achieved with the application of floor or wall insulation.

Apart from energy savings monitoring, the invention may also be utilized to measure the energy characteristics of sample materials. For example, instead of measuring temperature differences between baseline and retrofit samples, temperature differences could be measured between a first sample having known energy characteristics and a second sample whose energy characteristics it is desired to determine. Such a system can be applied to evaluate the energy performance characteristics of a material. For example, it could be used to formulate energy curves over various inside and outside conditions. In this manner, the invention could serve as a basis for a material evaluation and certification system.

Additionally, the technique could be utilized to increase energy savings through load shedding techniques. As known in the art, load shedding is the principle of shutting down unnecessary equipment on the basis of varying conditions, such as weather or reduced demand. Currently, typical perimeter HVAC systems are controlled by means of ambient space temperature sensors which do not adequately sense perimeter conditions. In particular, many conventional thermostatic devices in current use utilize discrete circuits for their operation and are thus too large and too expensive for embedding in otherwise low cost HVAC devices. As a result most residential units are served by one or two thermostats for entire homes. Commercial facilities typically utilize only a single thermostat in a particular zonal or multi-room area.

In contrast, the above mentioned thermostatic chip is small enough and inexpensive enough to be embedded into a large number of areas and allow more precise thermostatic control of individual rooms in both commercial and residential settings. Thus, in addition to facilitating calculation of energy savings obtained through retrofitting techniques such as adding insulation, it is possible to increase energy savings through more effective load shedding techniques based on improved temperature measurement than provided by conventional thermostats.

Moreover, due to their low cost, small size, and provision of PC compatible outputs, the above-noted sensors may be used in several other environments, such as diffusers and dampers, to serve solely as more effective thermostats. By embedding electronic thermostatic control into individual diffusers and dampers, it permits cost effective conversion of constant air volume systems in residences and commercial properties to an energy saving variable air volume system.

These advantages are also applicable in local area network (LAN) centers and co-located computer facilities. These devices require special air conditioning (AC) for rejection of heat produced by the processors to prevent data loss from shut down of the server from over-heating. A conventional method of protecting against data loss under these conditions uses alarms connected to the AC system to alert computer personnel of cooling systems failures so that back-ups can be performed prior to data loss. The above-noted sensors can be applied to monitor the temperature of these environments so as to automatically initiate backup procedures in the event of overheating, and, with Energy Star compliant computers, shut down unnecessary equipment to reduce heat loading and provide additional time for computer personnel to respond.

Various preferred embodiments of the invention have now been described in fulfillment of the objects of the invention. Many other alternate embodiments may be implemented without departing from the spirit and scope of the invention.

What is claimed is:

1. A method of determining the difference in thermal transfer between a first region and a second region, comprising the steps of:

measuring the temperature at said first region to obtain a first temperature reading;

measuring the temperature at said second region to obtain a second temperature reading;

subtracting the first temperature reading from the second temperature reading to obtain a temperature difference; and multiplying the temperature difference by a value representative of the heat transfer coefficient for the environment in which the first and second temperature readings are obtained, thereby calculating the heat differential between the first region and the second region;

wherein said first region is representative of a retrofit environment and said second region is representative of a baseline environment.

2. The method according to claim 1, further comprising the step of multiplying the heat differential by a value representative of an area of a retrofit surface, whereby the total energy savings from the retrofit in comparison to a baseline environment is determined.

3. The method according to claim 2, wherein the baseline environment comprises a window and the retrofit environment comprises the window with energy saving film applied thereto.

4. The method according to claim 2, wherein the baseline environment comprises a roof, wall or floor, and the retrofit environment comprises the roof, wall or floor with newly applied insulation applied thereto.

5. A method for measuring the energy savings obtained by retrofitting an environment with one or more energy saving materials, said method comprising the steps of:

providing a first sample region representative of the environment after retrofitting with the one or more energy saving materials;

providing a second sample region representative of the environment prior to retrofitting with the one or more energy saving materials;

calculating a temperature difference between the first sample region and the second sample region; and calculating the energy savings provided by the one or more energy saving materials on the basis of the temperature difference and the area of the environment to which the energy saving materials has been applied.

6. The method of claim 5 wherein the energy savings is calculated according to the following expression:

$$Q_{SAVINGS} = (t_B - t_R) h A$$

where $(t_B - t_R)$ is the temperature difference between the first sample region and the second sample region, h is the heat transfer coefficient of the region surrounding the first sample region and the second sample region and A is the area of the environment to which the one or more energy saving materials has been applied.

7. The method of claim 5 wherein the one or more energy savings materials comprises a film and the environment comprises one or more windows.

8. The method of claim 5 wherein the one or more energy savings materials comprises insulation and the environment comprises a roof, floor or wall.

9. The method of claim 5 wherein several pairs of sample regions are provided, each comprising one region representative of the environment prior to retrofitting with the one or more energy saving materials and another region representative of the environment after retrofitting with the one or more energy saving materials, and temperature differences are measured for each of the several pairs of sample regions, whereby the energy savings is calculated on the basis of plural measured temperature differences.

10. The method of claim 5 wherein the temperature of the first sample region and the temperature of the second sample region are measured with respective temperature sensors.

11. The method of claim 10, wherein each temperature sensor provides an output signal in a digital format.

12. The method of claim 11, wherein the energy savings is calculated with a processing device that is connected to the temperature sensors.

13. A system for measuring the energy savings in an environment to which one or more energy saving materials has been applied, said system comprising:
- at least one temperature sensor to measure a first region of said environment, said first region being representative of said environment after retrofitting with the one or more energy saving materials;
- at least one temperature sensors to measure a second region of said environment, said second region being representative of said environment prior to retrofitting with the one or more energy saving materials; and
- processing means for calculating energy savings on the basis of temperature readings from said temperature sensors.

14. The system of claim 13 wherein the processing means calculates energy savings based upon the following expression:

$$Q_{SAVINGS} = (t_B - t_R) h A$$

where $(t_B - t_R)$ is the temperature difference between the first region and the second region, h is the heat transfer coefficient of the region surrounding the temperature sensors, and A is the area of the environment to which the one or more energy saving materials has been applied.

15. The system of claim 13 wherein the one or more energy savings materials comprises a film and the environment comprises one or more windows.

16. The system of claim 13 wherein the one or more energy savings materials comprises insulation and the environment comprises a roof, floor or wall.

17. The system of claim 13 wherein several pairs of temperature sensors are provided throughout the environment, and temperature differences are measured for each of several pairs of regions within the environment, whereby the energy savings is calculated on the basis of plural measured temperature differences.

18. The system of claim 13, wherein each temperature sensor provides an output signal in a digital format.

* * * * *